United States Patent [19]

Ishibashi et al.

[11] Patent Number: 4,508,481

[45] Date of Patent: Apr. 2, 1985

[54] PROCESS FOR PREPARATION OF METAL VESSELS

[75] Inventors: Kazuhisa Ishibashi, Tokyo; Hideo Kurashima, Yokosuka; Hisakazu Yasumuro, Yokohama; Michio Watanabe, Yokohama; Tsuneo Imatani, Yokosuka; Kazuo Taira, Tokyo; Seishichi Kobayashi, Yokohama; Hiroshi Ueno, Yokosuka, all of Japan

[73] Assignee: Toyo Seikan Kaisha, Ltd., Tokyo, Japan

[21] Appl. No.: 426,241

[22] Filed: Sep. 28, 1982

[30] Foreign Application Priority Data

Oct. 26, 1981 [JP] Japan .................. 56-170200

[51] Int. Cl.$^3$ ............................. B23P 11/02
[52] U.S. Cl. ........................... 413/1; 156/69; 156/304.2; 413/7
[58] Field of Search .............. 413/1, 7, 18, 60, 69; 156/304.2, 308.4, 292, 293, 69, 309.9, 320, 324.4; 264/348

[56] References Cited

U.S. PATENT DOCUMENTS

| 3,636,186 | 1/1972 | Sturley | 156/293 |
| 4,056,876 | 11/1977 | Lammermann | 156/69 |
| 4,304,038 | 12/1981 | Yabu et al. | 156/304.2 |
| 4,372,459 | 2/1983 | Newman | 413/7 |
| 4,415,387 | 11/1983 | Newman | 156/69 |

Primary Examiner—Leon Gilden
Attorney, Agent, or Firm—Sherman & Shalloway

[57] ABSTRACT

Disclosed is a process for preparation of metal vessels, which comprises lap-bonding circumferential open end portions of outer and inner members, each consisting of a formed seamless metal cup, to each other through an adhesive, said process being characterized by fitting both the outer and inner members to each other through an adhesive layer interposed between the open end portions of both the members, heating the fitted portions of both the outer and inner members so as to melt the adhesive layer, and cooling the fitted portions so that the temperatures of the fitted portions of both the outer and inner members are substantially equal to each other just before solidification of the adhesive layer and the adhesive is filled between both the open end portions.

7 Claims, 12 Drawing Figures

PROCESS FOR PREPARATION OF METAL VESSELS

BACKGROUND OF THE INVENTION (1) Field of the Invention

The present invention relates to a process for the preparation of metal vessels. More particularly, the present invention relates to a process for preparing metal vessels with lap-bonding circumferential end portions of upper and lower members, each consisting of a formed seamless metal cup, to each other through an adhesive, in which generation of a tensile stress in the adhesive layer is prevented, whereby metal vessels excellent in the adhesion and sealing properties of the seam and the durabilities of these properties are produced.

Bottle-like metal vessels obtained by lap-bonding upper and lower members, each consisting of a cup-like article formed by drawing or draw-ironing of a metallic material, on the circumferential open end portions thereof to form a circumferential side seam are advantageous in various points over metal vessels in the form of a can.

(2) Description of the Prior Art

Conventional packaging metal vessels include a so-called three-piece can obtained by double-seaming can lids to the top and bottom of a can barrel having a side seam to form sealed portions and a so-called two-piece can obtained by double-seaming a can lid to the open end portion of a cup-like can barrel formed by drawing or draw-ironing of a metallic material to form a sealed portion.

Metallic vessels having this double-seam structure are much limited in the pressure resistance of the sealed portion or the saving of a metallic material. More specifically, in a seam formed by double seaming, if a load is applied to the seam, the material constituting the seam is first deformed, and by this deformation, leakage from the seam or breakdown of the seam is caused under a relatively small load. In order to avoid this disadvantage, the thickness of the material should be increased. In the field of packaging vessels, from the economical viewpoint and in order to reduce the weight of a vessel, it always is required to reduce the thickness of a metallic material. However, if the thickness of the barrel wall of a vessel is reduced, at the double-seaming step or at the step of preparing for the flanging operation, buckling is readily caused under a load applied in the axial direction of the vessel.

A metallic bottle obtained by lap-bonding the open end portions of upper and lower members, each consisting of a formed cup, is advantageous in that even if the thickness of a seam-constituting material is extremely small, deformation of the material is not caused on the seam by the difference between the outer and inner pressures or the load applied in the axial direction and the seam can resist a load within the critical shear strength thereof irrespectively of the thickness of the material and that since the double-seaming operation need not be performed, the thickness of the side wall of the vessel can be reduced without any risk of occurrence of buckling.

However, in the case where a circumferential side seam is formed by lap-bonding the open end portions of upper and lower members through an adhesive, various problems should be solved so as to provide a strong bonding on the seam and give a reliable seal to the seam.

More specifically, in the lap bonding using an adhesive, no satisfactory bonding force can be obtained unless a certain pressure is applied to an adhesive layer interposed between portions to be bonded. Furthermore, if a stress is left in the adhesive layer, especially if a stress is left in the lapping direction, the adhesion or sealing property is drastically reduced with the lapse of time or under application of an external force.

In the case where a lap seam is straight as in an ordinary can barrel, compression of the lapped portion can be accomplished relatively easily, but when circumferential open end portions of formed cups are lap-bonded, it is very difficult to apply a pressure to the lapped portion.

As means for imparting a pressing force necessary for bonding the lapped portions, there is known a method in which the end portion of a member to be located on the outer side of the seam (often referred to as "outer member" hereinafter) is heated to increase the diameter thereof, a member to be located on the inner side of the seam (often referred to as "inner member" hereinafter) is fitted into the outer member through an adhesive layer, the end portion of the inner member is heated and the end portion of the inner member is thereby expanded in the end portion of the outer member to effect heat bonding through the adhesive (see Japanese Patent Application Laid-Open Specification No. 32228/81).

According to this method, it is possible to press both the end portions of the inner and outer members to the adhesive layer in the molten state, but by this pressing force, the molten adhesive is protruded outward from the lap of both the end portions and the thickness of the adhesive layer is often smaller than the clamping thickness in the normal state. Moreover, since the end portion of the inner member is heated at a higher temperature at the bonding step, the shrinkage of the end portion of the inner member in the radial direction is larger than the shrinkage of the end portion of the outer member. For these reasons, the tensile stress in the radial direction is left in the adhesive layer interposed between both the end portions in the normal state, and deterioration of the adhesion on the interface or leakage from the interface is caused by this tensile stress.

SUMMARY OF THE INVENTION

It is therefore a primary object of the present invention to provide a process for the production of a metal vessel provided with a circumferential seam formed by lap bonding, in which a metal vessel excellent in the adhesion and sealing property and the durabilities of these properties can be produced without preventing the tensile stress from being left in the adhesive layer.

Another object of the present invention is to provide a process for the production of a metal vessel provided with a circumferential seam formed by lap bonding, in which this metal vessel can be manufactured at a high productivity by relatively simple means.

Still another object of the present invention is to provide a process in which the tensile stress is prevented from being left in the adhesive layer by controlling the temperature at the bonding step or selecting an appropriate adhesive.

More specifically, in accordance with the present invention, there is provided a process for preparation of metal vessels, which comprises lap-bonding circumferential open end portions of outer and inner members, each consisting of a formed metal cup, to each other through an adhesive, said process being characterized by fitting both the outer and inner members to each other through an adhesive layer interposed between the open end portions of both the members, heating the fitted portions of both the outer and inner members so as to melt the adhesive layer, and cooling the fitted portions so that the temperatures of the fitted portions of both the outer and inner members are substantially equal to each other just before solidification of the adhesive layer and the adhesive is filled between both the open end portions.

BRIEF DESCRIPTION OF THE DRAWINGS

FIG. 3-B is a graph illustrating the relation of the temperatures of the respective parts of the fitted portion to the time at the heating and cooling steps.

Figure 1:
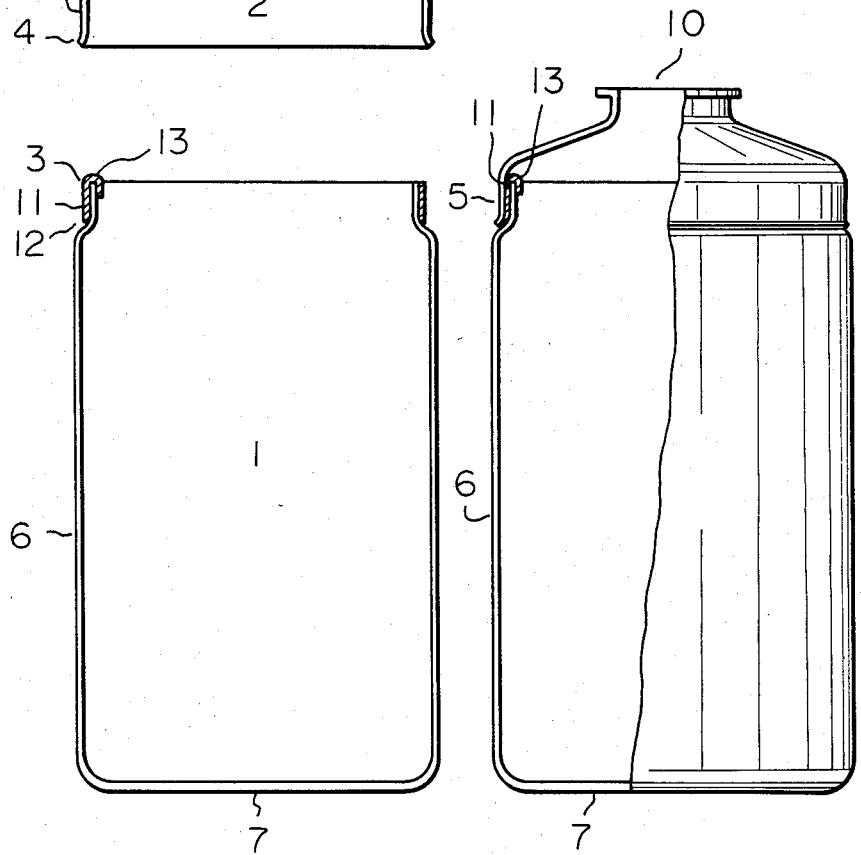
FIG. 1 is a sectional side view showing a lower member and an upper member before fitting.

In the drawings, reference numerals 1 and 2 represent a lower member (inner member) and an upper member (outer member), respectively, and reference numerals 3 and 4 represent open end portions. Reference numeral 5 represents a seam and reference numeral 5a represents a fitted portion. Reference numerals 11, 13 and 14 represent an adhesive layer, a coating and a high frequency induction coil, respectively, and reference numerals 21a and 21b represent cooling nozzles.

DETAILED DESCRIPTION OF THE PREFERRED EMBODIMENT

The present invention will now be described in detail.

Figure 2:
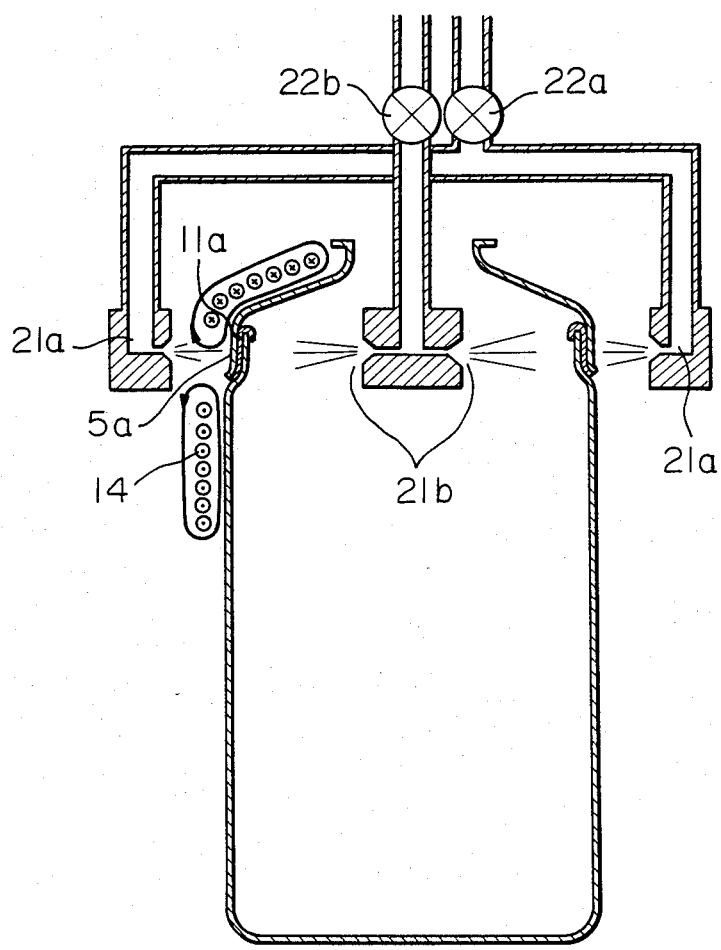
FIG. 2 is a partially sectional side view showing the metal vessel according to the present invention.

Referring to FIGS. 1 and 2 illustrating one embodiment of the metallic bottle according to the present invention, this bottle comprises a lower member 1 consisting of a seamless formed cup of a metal such as a tin-deposited steel plate and an upper member 2 consisting of a seamless formed cup of a metal, and open end portions 3 and 4 of these formed cups are lap-bonded to form a circumferential side seam 5, whereby both the cups are integrated in a vessel.

In this embodiment, the lower member 1 is a cup comprising a tall thin side wall 6 formed by high-degree draw-ironing of a metallic material and a thick bottom 7 which has not substantially be ironed, and the upper member 2 is a cup comprising a short side wall 8 and top wall 9 formed by shallow drawing of a metallic material. The height of the side wall 8 of the lower member 2 is equal to or slightly larger than the width of the seam 5. The top wall 9 of the lower member 2 has an upwardly protruded tapered surface, and a pouring mouth 10 for packing or withdrawing the content is formed at the center of the top wall 9. It will readily be understood that the upper member 2 is bonded in the form of a so-called shoulder and neck to the lower member 1.

In the embodiment illustrated shown in FIG. 1, the diameter of the open end portion 3 of the lower member 1 is reduced below the diameter of the other barrel wall portion by necking of the portion adjoining to the open end portion 3, and this diameter-reduced open end portion 3 is fitted and inserted into the larger-diameter open end portion 4 of the upper member 2. An adhesive layer 11 is interposed between the outer surface of the open end portion 3 of the lower member 1 and the inner surface of the open end portion 4 of the upper member 2, and the lower and upper members are bonded together by this adhesive layer 11. From the viewpoint of the corrosion resistance, it is preferred that a part of the adhesive 11 be protruded from the seam 5 to form a covering layer 13 for a cut edge 12 of the metallic material located on the inner side of the seam 5.

In the embodiment illustrated in the accompanying drawings, the lower member 1 is an inner member and the upper member 2 is an outer member. Of course, there may optionally be adopted a reverse structure in which the lower member is an outer member and the upper member is an inner member.

In the process for producing metal vessels according to the present invention, referring to FIG. 1 showing the state before fitting, inner and outer members 1 and 2 are fitted together at the fitting step in the state where an adhesive layer 11 is interposed between the open end portions 3 and 4 of the inner and outer members 1 and 2. In the embodiment illustrated in the accompanying drawings, the adhesive layer 11 is formed on the outer peripheral surface of the end portion 3 of the inner member. In the present invention, however, the adhesive layer may be formed on the inner circumferential surface of the end portion 4 of the outer member or on both the surfaces.

Figure 3:
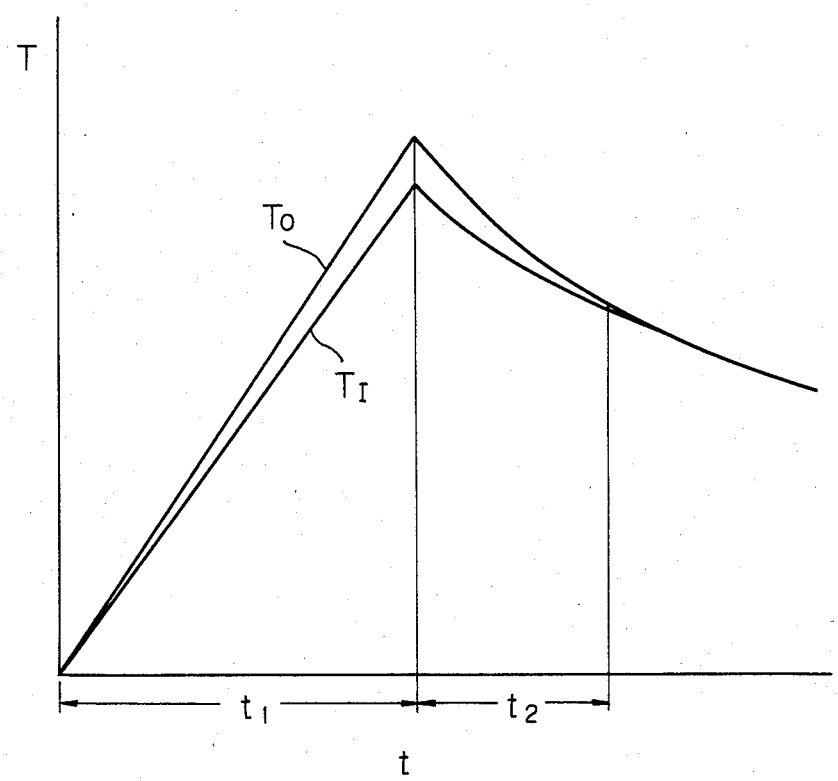
FIG. 3-A is a sectional side view illustrating the steps of heating and cooling the fitted portion.

At the subsequent heating step, the fitted portion 5a of both the end portions 3 and 4 is heated to melt the adhesive layer 11a. Heating of the fitted portion 5a is advantageously accomplished by applying the magnetic force line of a high frequency induction heating coil 14 to the fitted portion 5a, as shown in FIG. 3-A, to induce eddy currents in both the end portions 3 and 4. Moreover, there may be adopted other heating mechanisms, for example, a hot air furnace, an infrared ray heater, a direct fire heater or a contact with a heating medium or heating system.

Finally, at the cooling step, cooling air or cooling water is sprayed to the fitted portion 5a from a nozzle 21a located on the outer side of the fitted portion 5a and a nozzle 21b located on the inner side of the seam, whereby the fitted portion 5a having the adhesive layer 11a in the molten state is cooled to solidify the adhesive layer and form the seam. Electromagnetic valves 22a and 22b are disposed to control supply of compressed air or water so that compressed air or water is sprayed only for a predetermined time just after completion of heating.

The important feature of the present invention resides in the finding that if cooling of the fitted portion 5a is effected so that the temperature of both the members 3 and 4 in the fitted portion 5a are substantially equal to each other just before solidification of the adhesive layer 11a and the adhesive 11a is filled in both the open end portions 3 and 4, occurrence of the phenomenon of remaining of the tensile stress in the adhesive layer in the normal state is effectively prevented while sufficiently enhancing the bonding force between both the end portions, with the result that the adhesion and sealing property of the seam and the durabilities of these properties are prominently improved.

Even if the temperatures of both the members 3 and 4 in the fitted portion 5a are substantially equal to each other when the adhesive is melted, the outer member 4 is first cooled by the customary cooling operation, and since the interposed adhesive layer 11a acts as a heat-insulating layer, the temperature of the inner member 3 is much higher than the temperature of the outer member 4 just before solidification of the adhesive layer 11a. As pointed out, this tendency is conspicuous in the conventional method in which the inner member 3 is heated at the bonding step. In the state where the inner member 3 is maintained at a high temperature, the adhesive is squeezed out from the lap portion by expansion of the inner member in the radial direction to reduce the thickness of the adhesive layer, and when the fitted portion 5a is cooled to room temperature, the shrinkage quantity of the inner member 3 is larger than that of the outer member 4 and as the result, the tensile stress in the lapping direction is left in the adhesive layer.

If the temperature of the outer member 4 is much higher than the temperature of the inner member 3 at the time of bonding the fitted porton or if the bonded fitted portion is rapidly cooled from the inner side of the vessel after the bonding step, the temperature of the outer member 4 is often much higher than the temperature of the inner member 3 just before solidification of the adhesive layer 11a. In this case, expansion of the outer member 4 in the radial direction is increased and the pressing force to the adhesive layer 11a between both the members 3 and 4 is decreased, with the result that the bonding force of the seam is drastically reduced. In an extreme case, a clearance is formed between the adhesive layer 11a and the outer member 4.

In contrast, according to the present invention, cooling is carried out so that just before solidification of the adhesive layer 11a, both the end portions 3 and 4 in the fitted portion 5a are maintained at the substantially same temperature, whereby a pressing force necessary bonding for formation of the seam can be attained assuredly and occurrence of the phenomenon of remaining of the tensile stress in the adhesive layer is effectively prevented.

In the present invention, by the expression "the temperatures of both the end portions are substantially equal to each other", it is meant that the difference between both the temperatures is within a range of $\pm 20°$ C., preferably $\pm 10°$ C. Strictly speaking, the allowable range is broader if the temperature T1 of the end portion 3 of the inner member is lower than the temperature T2 of the end portion of the outer member, but the allowable range is narrower if the temperature T1 is higher than the temperature T2. It is most preferred that both the temperatures be in the range represented by the following formula:

$$T2 + 10° C. \geqq T1 \geqq T2 - 5° C. \tag{I}$$

As pointed out hereinbefore, heating from the side of the end portion 3 of the inner member or heating from the side of the end portion 4 of the outer member is not suitable for conducting cooling of the fitted portion 5 under the above-mentioned conditions. In the present invention, it is preferred that heating of the fitted portion be carried out so that the temperature of the inner member 3 is substantially equal to or slightly lower than the temperature of the outer member 4. It is permissible that the temperature of the inner member is lower by up to 50° C., especially up to 10° C., than the temperature of the outer member.

Referring to FIG. 3-B illustrating the relation between the temperatures of the respective parts in the fitted portion and the time, the inner and outer members 3 and 4 present in the fitted portion are heated from both the sides until the time t1 so that the temperature $T_1$ of the inner member 3 is slightly lower than or substantially equal to the temperature $T_0$ of the outer member 4, and at the time t1, heating is stopped. By stopping of heating, the fitted portion 5a is cooled and the temperatures of both the members 3 and 4 are gradually lowered, and after passage of the time t2, solidification of the adhesive layer 11a is initiated. In this preferred embodiment of the present invention, by controlling the temperature of the inner member at the heating step, the temperatures of both the members can easily be maintained at the substantially same level just before solidification of the adhesive layer 11a.

In order to maintain the temperatures of the inner and outer members at the substantially same level at the cooling step conducted after the heating step, it is preferred that the cooling speed of the outer member 4 which is more readily cooled be lowered. For attaining this feature, there may be adopted a method in which the atmosphere on the outside of the vessel is maintained at an elevated temperature or a method in which the inner side of the vessel is forcibly cooled so as to increase the cooling speed of the inner member which is not readily cooled. When cooling is effected by blowing cold air to the fitted portion, there may advantageously be adopted a method in which the temperature of cold air to be blown to the inner member is made lower than the temperature of cold air to be blown to the outer member.

In short, in the present invention, cooling is carried out under such conditions that just before solidification of the adhesive layer 11a, the temperature of both the end portions 3 and 4 in the fitted portion 5a are substantially equal to each other. It must be noted that this can be attained by adopting, singly or in combination, optional means for adjusting heating conditions and optional means for adjusting cooling conditions.

In the present invention, it also is important that just before solidification of the adhesive layer 11a, the molten adhesive should be filled between both the open end portions 3 and 4 without a gap. This filling of the adhesive without a gap is attained if the following dimensional requirements are satisfied:

$$D_O \geqq D_I \tag{II}$$

and $$D_I + 2d_A > D_O \tag{III}$$

wherein $D_I$ stands for the outer diameter of the fitted portion of the inner member, $D_O$ stands for the inner diameter of the fitted portion of the outer member, and $d_A$ stands for the applied thickness of the adhesive layer.

In order to prevent generation of the tensile stress in the adhesive layer of the seam to be formed, it is preferred that a thermoplastic resin adhesive in which the change of the volume in the melting-solidification cycle is small be used as the adhesive. According to a preferred embodiment of the present invention, as the adhesive, there is used a thermoplastic resin adhesive having a volume change ratio δ lower than 10%, especially lower than 8%, at a temperature in the range of Ts±10° C. in which Ts stands for the temperature at which the adhesive is substantially solidified and also having a softening point of 80° to 280° C., especially 90° to 240° C., said volume change ratio δ being expressed by the following formula:

$$\delta = \frac{Va - Vb}{Vb} \times 100 \qquad (IV)$$

wherein Va stands for the specific volume (c.c./g) at the temperature of Ts+10° C. and Vb stands for the specific volume (c.c./g) at the temperature of Ts−10° C.

The temperature Ts at which the adhesive is substantially solidified, referred to in the instant specification, is a value determined according to the following method. While the temperature of the adhesive resin in the molten state is gradually lowered, the temperature-specific volume curve is measured by a dilatometer, and the lower temperature of the temperatures giving the largest gradient to the temperature-specific volume curve is designated as the temperature Ts at which the adhesive is substantially solidified. In case of a crystalline resin, this temperature Ts corresponds substantially to the temperature at the exothermic peak in the differential thermal analysis.

In the above formula (IV), the specific volume Va indicates the specific volume of the adhesive in the molten state and the specific volume Vb indicates the specific volume of the adhesive in the solidified state. Accordingly, the volume change ratio δ indicates the change of the volume, that is, the decrease of the volume, observed when the adhesive in the molten state is transformed into a solid. Also in case of an adhesive resin, elevation of the temperature should naturally result in increase of the volume. This volume change is especially large in the range of from Ts+10° C. to Ts−10° C., and the volume change in this temperature range has important influences on the tensile stress left in the adhesive layer. At a temperature higher than Ts+10° C., the stress formed in the resin is substantially moderated in a relatively short time but the volume decrease tends to remain as the tensile stress by shrinkage in the adhesive layer after solidification. In the present invention, by selecting and using an adhesive resin in which this volume shrinkage ratio δ is lower than 10%, remaining of the tensile stress in the adhesive layer can be prevented more effectively.

As the metallic material to be formed into a seamless cup, there can be used untreated steel plates (black plates), various surface-treated steel plates, for example, deposited steel plates such as tin-deposited steel plates (tinplates) zinc-deposited steel plates, aluminum-deposited steel plates, nickel-deposited steel plates and chromium-deposited steel plates and chemically treated steel plates such as steel plates treated with phosphoric acid and/or chromic acid, plates of light metals such as aluminum, and composite plate materials thereof.

For the production of a seamless cup, a metallic material such as mentioned above is punched in the form of a disc or the like, the disc is subjected to a one-staged or multi-stage drawing operation between a drawing punch and a drawing die, and the drawn cup is then subjected, if desired, to a multi-staged ironing operation between an ironing punch and an ironing die. The drawing and ironing conditions are known, and the drawing and ironing operations may be carried out under these known conditions.

The thickness of the metallic material to be processed is changed according to the size of the final bottle and the kind of the material, but it is ordinarily preferred that the thickness of the metallic material be 0.2 to 0.5 mm, especially 0.2 to 0.35 mm. When the ironing operation is carried out, it is preferred that the ironing operation be conducted to such an extent that the thickness of the side wall portion is 0.05 to 0.20 mm, especially 0.06 to 0.17 mm.

The metallic material is coated with an anticorrosive protecting paint before formation into a cup, or a formed cup is trimmed and, if desired, subjected to a washing treatment and a chemical surface treatment with phosphoric acid and/or chromic acid and at the inner surface of the formed cup is coated with an anticorrosive protecting paint. As the protecting paint, there can be used optional paints composed of thermosetting and thermoplastic resins, for example, modified epoxy paints such as phenol-epoxy paints and amino-epoxy paints, vinyl and modified vinyl paints such as vinyl chloride/vinyl acetate copolymer paints, partially saponified vinyl chloride/vinyl acetate copolymer paints, vinyl chloride/vinyl acetate/maleic anhydride copolymer paints, epoxy-modified vinyl resin paints, epoxyamino-modified vinyl resin paints and epoxyphenyl-modified vinyl resin paints, acrylic resin paints, and synthetic rubber paints such as styrene/butadiene copolymer paints.

The protecting paint is applied in the form of an organic solvent solution such as an enamel or lacquer or an aqueous dispersion or solution to the formed cup according to spray coating, dip coating, electrostatic coating or electrophoretic coating. Of course, when a thermosetting resin type paint is used, the coated paint is baked according to need.

In order for this thermoplastic resin to sufficiently wet the surface of a metallic material constituting the seam or a primer coated thereon even under a relatively low pressure and provide a strong and durable bonding to this surface, it is preferred that the thermoplastic resin should contain in the main or side chain thereof polar groups at a certain concentration. In the present invention, therefore, a thermoplastic resin containing in the main or side chain groups

(hereinafter referred to as "carbonyl groups") at a concentration of 10 to 1400 milliequivalents (meq), preferably 12 to 1200 meq, per 100 g of the resin is used. These carbonyl groups are derived from carboxylic acid, carboxylic acid salts, carboxylic anhydrides, carboxylic acid esters, carboxylic acid amides, ketones, carbonic acid esters, urea, urethane or the like. This thermoplastic polymer can be obtained by introducing a monomer having the above-mentioned functional group into the main chain of a polymer by homopolymerization or copolymerization or by bonding this monomer to a thermoplastic resin by graft polymerization or terminal treatment. Moreover, a thermoplastic resin containing carbonyl groups at the above-mentioned concentration can be obtained by oxidizing a hydrocarbon polymer such as an olefin resin.

When the carbonyl group concentration is too low and below the above-mentioned range, the adhesion or bonding force to the material constituting the seam is insufficient under a relatively low pressure, and when the carbonyl group concentration is too high and above the above range, the adhesive layer becomes sensitive to moisture or water and the water resistance or hot water resistance of the seam is reduced, and the cohesive force of the adhesive layer becomes too high and the heating-bonding operation becomes difficult or the toughness is lost. In the present invention, by controlling the carbonyl group concentration in the polymer within the above-mentioned range, the bonding force is prominently improved even under a relatively low pressure, and the operation of applying the adhesive in the form of a film or the like to the portion to be bonded or the heat-bonding operation can be facilitated.

Thermoplastic resin adhesives that are suitably used in the present invention will now be mentioned. However, it must be noted that in these thermoplastic resins, the monomer composition, molecular weight, molecular weight distribution blend ratio should be selected so that the above-mentioned requirements are satisfied.

Preferred examples of the thermoplastic polymer that can be used in the present invention are as follows, though resins that can be used are not limited to those exemplified below.

[A] Polyesters comprising recurring units represented by the following general formula:

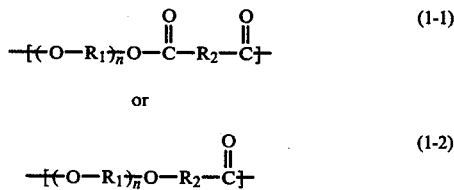

wherein $-(-O-)-R_1)_n$ stands for an oxyalkylene group having 2 to 6 carbon atoms or a polymer thereof, and $R_2$ stands for an alkylene or arylene group having 2 to 24 carbon atoms.

As the dibasic acid component, there can be mentioned terephthalic acid, isophthalic acid, adipic acid, sebacic acid, maleic acid and fumaric, and as the glycol component, there can be mentioned ethylene glycol, tetramethylene glycol, propylene glycol, diethylene glycol, triethylene glycol and polymers thereof, that is, polyalkylene glycols. Homopolymers comprising one dibasic acid component and one glycol component and copolyesters comprising a plurality of dibasic acid components and/or a plurality of glycol components are used. For example, there can be mentioned polyethylene adipate, polyethylene sebatate, polyethylene terephthalate, polytetramethylene isophthalate, polyethylene terephthalate/isophthalate, polytetramethylene terephthalate, polyethylene/tetramethylene terephthalate, polyethylene hydroxybenzoate, and copolyesters and blends thereof. In order to modify the properties of the adhesive, some of these polymers may be blended or these polymers may be blended with other resins, for example, polyolefins such as polyethylene, polypropylene, ionomers, ethylene-vinyl acetate copolymers or modified polypropylenes.

[B] Homopolymers or copolymers of monomers represented by the following general formula, copolymers of these monomers with olefins or other vinyl monomers, or acrylic-modified polyolefins:

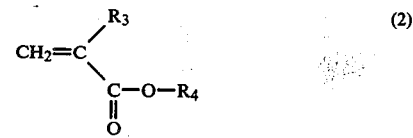

wherein $R_3$ stands for a hydrogen atom or a lower alkyl group, and $R_4$ stands for a hydrogen atom or an alkyl group having 1 to 12 carbon atoms.

For example, there can be mentioned polyacrylic acid esters, polymethacrylic acid esters, ethylene/acrylic acid ester copolymers, acrylic acid ester/acrylic acid copolymers, ethylene/acrylic acid ester/acrylic acid copolymers, ethylene/acrylic acid copolymers, styrene/methacrylic acid ester/acrylic acid copolymers, acrylic acid-grafted polyethylene, acrylic acid-grafted polypropylene, acrylic acid ester/vinyl chloride copolymers, acrylic acid ester-grafted polyethylene, methacrylic acid ester/vinyl chloride copolymers, styrene/methacrylic acid ester/butadiene copolymers and methacrylic acid ester/acrylonitrile copolymers.

[C] Copolymers of vinyl esters represented by the following general formula:

wherein $R_5$ stands for a hydrogen atom or an alkyl or phenyl group, with olefins or other vinyl monomers, and partial saponification products thereof.

For example, there can be mentioned partially saponified ethylene/vinyl acetate copolymers, ethylene/vinyl propionate copolymers, ethylene/vinyl acetate copolymers, acrylic acid ester/vinyl acetate copolymers and vinyl chloride/vinyl acetate copolymers.

[D] Ionomers, that is, resins obtained by neutralizing copolymers of olefins with unsaturated carboxylic acids, optionally further with other vinyl monomers, by an alkali metal, an alkaline earth metal or an organic base.

For example, there can be mentioned Surlyns supplied by Du Pont Co., U.S.A.

[E] Copolymers of maleic anhydride with other vinyl monomers and maleic anhydride-modified polyolefins.

For example, there can be mentioned maleic anhydride/styrene copolymers, maleic anhydride-modified polypropylene and maleic anhydride-modified polyethylene.

[F] Polycarbonates having recurring units represented by the following general formula and copolycarbonates with aliphatic dihydroxyl compounds or aromatic dihydroxyl compounds:

wherein $R_6$ stands for a hydrocarbon group having 8 to 15 carbon atoms.

For example, there can be mentioned poly-p-xylene glycol biscarbonate, polydihydroxydiphenylmethane carbonate, polydihydroxydiphenylethane carbonate, polydihydroxydiphenyl-2,2-propane carbonate and polydihydroxydiphenyl-1,1-ethane carbonate.

[G] Polyamides and copolyamides comprising the following recurring units:

or

wherein n is a number of from 3 to 3 and m is a number of from 4 to 11.

For example, there can be mentioned poly-ω-aminocaproic acid, poly-ω-heptanoic acid, poly-ω-aminocaprylic acid, poly-ω-aminopelagonic acid, poly-ω-aminodecanoic acid, poly-ω-aminoundecanoic acid, poly-ω-aminododecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydecamethylene azelamide, polydodecamethylene azelamide and polytridecamethylene azelamide.

In order to improve the toughness, handling property and slip characteristic of the adhesive, a copolyamide comprising components as indicated above may be blended with other resin such as a polyolefin.

[H] Polyureas having recurring units represented by the following general formula:

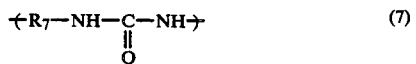

or

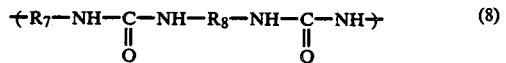

wherein $R_7$ and $R_8$ stand for an alkylene group having 1 to 13 carbon atoms. For example, there can be mentioned polyhexamethylene-urea, polyheptamethylene-urea, polyundecamethylene-urea and polynonamethylene-urea.

[I] Polyurethanes and polyureaurethanes having the following recurring units:

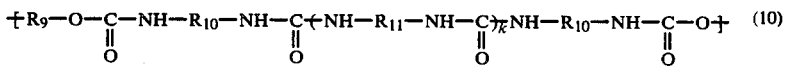

wherein $R_9$ stands for an alkylene group, polyether residue or polyester residue having 3 to 24 carbon atoms, $R_{10}$ stands for an alkylene or arylene group having 3 to 24 carbon atoms, $R_{11}$ stands for an alkylene or arylene group having 1 to 13 carbon atoms, and k is a number of 0 or 1.

For example, there can be mentioned polytetramethylene-hexamethylene-urethane, polyhexamethylene-tetramethylene-urethane, and polyureaurethanes formed by chain-extending isocyanate-terminated polyesters or isocyanate-terminated polyethers with diamines or water.

[J] Resins obtained by oxidizing polyethylene, polypropylene or a crystalline ethylene/propylene copolymer with oxygen, ozone or other oxidant.

Resins especially suitable for attaining the objects of the present invention are polyesters, especially copolyesters, polyamides, ionomers, acid-modified polyolefins and polycarbonates, as recited in order of importance.

Preferred copolyesters are copolyesters comprising terephthalic acid units and other dibasic acid units as the dibasic acid components and tetramethylene glycol units as the diol component and copolyesters comprising benzene-dicarboxylic acid units as the dibasic acid component and tetramethylene glycol units and other diol units as the diol component.

At least one nylon containing 4 to 12 amine groups per 100 carbon atoms is preferred as the polyamide.

The thermoplastic resin to be used in the present invention should have a sufficiently high molecular weight, and it is preferred that the number average molecular weight of the thermoplastic resin be at least 6,000, especially 9,000 to 500,000. In view of the heat-fusion-bondability and in order to facilitate the heat-bonding operation, it is preferred that the softening point (melting point) of the thermoplastic resin be 80° to 280° C., especially 90° to 240° C.

Known additives such as ultraviolet absorbers, stabilizers, lubricants, antioxidants, fillers, pigments, dyes and antistatic agents may be incorporated into the thermoplastic resin according to known recipes, if desired.

In the present invention, the adhesive is applied to the open end portions of the cups to be bonded before fitting of the cups. It is preferred that the adhesive be applied so that the thickness of the adhesive resin layer is 10 to 200 μm, especially 20 to 150 μm, and that the width of the lap-bonded portion, that is, the lap width is 1 to 30 mm, especially 2 to 20 mm.

The adhesive resin may be applied in various forms, for example, a film, a powder, a slurry, a solution, a plastisol and an emulsion, to a desirable part of the cup. In order to facilitate handling, coating and drying of the adhesive resin, it is preferred that the adhesive resin be applied in the form of a film.

For application of the adhesive, there may be adopted various coating methods such as lamination, extrusion, electrostatic powder coating, electrostatic deposition coating, spray coating, nozzle extrusion, dip coating, roll coating and brush coating, and an appropriate coating method is selected according to the kind and form of the adhesive.

When the above-mentioned protecting paint is applied to the portion, to be bonded, of the metallic material, this paint acts as a primer, and a desirable bondability is obtained. Of course, a paint acting as a primer may be coated on the metallic material prior to application of the adhesive.

In the case where the circumferential open end portions of the cups are lap-bonded, a cut edge of the metallic material is inevitably exposed to the inner side of the seam. This cut edge may be protected before fitting of the cups by wrapping the cut edge with an adhesive tape or applying a powder, slurry or solution of the adhesive to the cut edge.

The adhesive may be applied to the outer or inner face of the open end portion of the cut to be formed into the inner or outer side of the seam, or to both the above-mentioned inner and outer surfaces.

The adhesive-applied cup is fitted with the other cup, and the adhesive present in the lapped portion is melted and, if desired, the formed seam is cooled, whereby the intended seam is obtained. Heating of the lapped portion can be performed by high frequency induction heating, infrared ray heating, hot air heating and induction heating from a heating member, and cooling of the seam can be accomplished by optional cooling means such as natural cooling, air cooling and water cooling. Of course, heating and cooling should be carried out so that the above-mentioned requirements are satisfied.

The vessel of the present invention is especially suitable as a vessel for a content having a spontaneous pressure, such as a carbonated drink, beer or bubbled spirit and also as an inner pressure vessel in which nitrogen gas or liquefied nitrogen is packed together with a content.

The metal vessel of the present invention is prominently advantageous over conventional plastic bottles (biaxially drawn polyethylene terephthalate bottles) and glass bottles. These advantages are summarized in Table A.

TABLE A

|  | Metal Vessel of Present Invention | Plastic Bottle (PET) | Glass Bottle |
| --- | --- | --- | --- |
| Light weight (handling property) | ◯ | ◯ | X |
| Falling strength | ◯ | ◯ | X |
| Dimension stability (heat-resistant, pressure-resistant creep property) | ◯ | X | ◯ |
| Gas barrier property | ◎ | △ | ◯ |
| Light shielding property | ◯ | △ | ◯ |
| Manufacturing rate | ◯ | △ | △ |
| Rate of cooling content | ◯ (prominent with increase of volume) | X | △ |
| Crushability | ◯ | X | X |

The present invention will now be described in detail with reference to the following Examples.

In preparing metal vessels according to the present invention, the volume change ratio δ at the temperature Ts (°C.) at which the thermoplastic adhesive used is substantially solidified is determined according to the following method.

[Method of Measurement of Volume Change Ratio δ]

Figure 4:
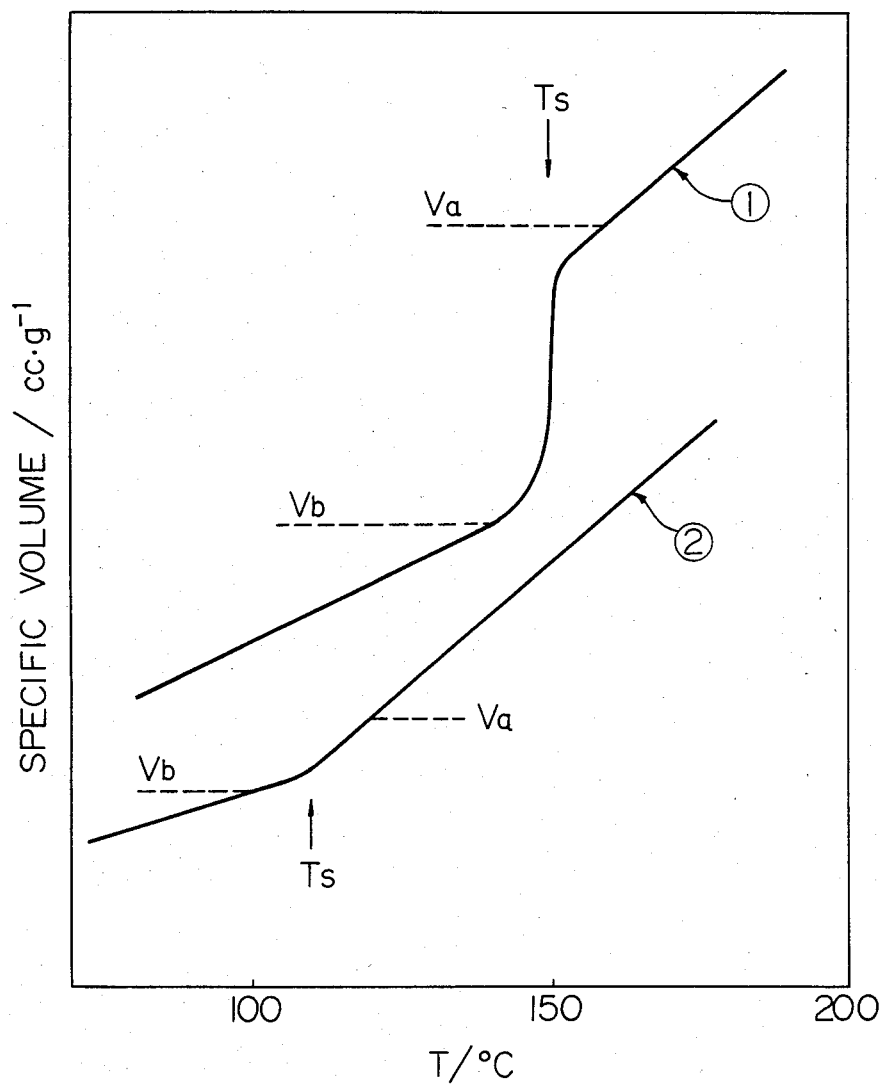
FIG. 4 is a graph illustrating the relation between the specific volume and the temperature in two kinds of adhesive resins.

The measurement of the volume change ratio is carried out according to the method of Beccedahl [J. Res. Netl. Bus. Standards, 42, 154 (1949)] using a dilatometer. More specifically, a block of a thermoplastic resin adhesive having a volume of 0.5 to 1.5 $cm^3$ is contained in a predetermined dilatometer and mercury is sealed according to customary procedures. The adhesive is maintained at a temperature higher by 50° C. than the softening point of the adhesive resin. Then, the temperature is lowered at a rate of 0.5° C./min and the change of the meniscus is directly read at certain time intervals by means of a cathetometer. Various corrections are performed to eliminate errors due to expansion of the volume of glass and to a thermometer, and a specific volume-temperature curve of each sample is obtained. FIG. 4 shows the specific volume-temperature curves of (1) nylon 12 and (2) a styrene-methyl methacrylate copolymer. The lower temperature of the temperatures at which the gradient (absolute value) of the specific volume-temperature curve is largest is designated as the temperature Ts at which the adhesive is substantially solidified. In case of nylon 12, the temperature Ts is 150° C. corresponding to the curve, and in case of the styrene-methyl methacrylate copolymer, the temperature Ts is 110° C. at which the linear portion of the curve on the high temperature side begins to bend. The specific volumes Va and Vb at Ts+10° C. and Ts−10° C. are determined from the curve and the volume change ratio δ is calculated according to the formula (IV). In case of an adhesive comprising a blend of thermoplastic resins, it often happens that several bending points appear on the specific volume-temperature curve. In such case, a largest gradient is observed in the region where the change of the specific volume is large, and therefore, the temperature of this largest gradient is designated as Ts.

In the Examples, metal vessels are evaluated according to the following methods.

[Evaluation of Metal Vessels]

A. TEST OF STRENGTH OF BONDED PORTION:

(a) Tensile Stress (Measurement of Strain in Bonded Portion):

A band-like specimen having a width of 30 mm is cut out from the bonded portion of a formed metal vessel by a laser cutter so that no force is applied to the bonded portion. Eight strain gauges are bonded at equal intervals on each of the outer and inner sides of the band-like specimen of the bonded portion so that the longitudinal direction of the strain gauges is in agreement with the circumferential direction of the specimen of the bonded portion. In order to measure the strains imposed on the outer and inner members of the band-like specimen of the bonded portion, the adhesive should be dissolved. An appropriate solvent for dissolving the adhesive is selected according to the kind of the adhesive, and the temperature of the solvent is maintained in the range of from room temperature to 90° C.

The strain gauge-bonded band-like specimen of the bonded portion is immersed in a beaker charged with the solvent, and the resistance value of each strain gauge is continuously measured until the adhesive of the bonded portion is dissolved.

Since the outer member is thicker than the inner member, the strain on the outer member is smaller. Accordingly, in the state where the stress is applied to the adhesive, the change of the resistance of the strain gauges of the inner member is larger than that of the outer member. If the resistance of the strain gauges of the inner member is increased, this means elongation of the periphery of the inner member, and the compressive stress is imposed on the adhesive. If the resistance value is decreased, the tensile stress is imposed on the adhesive.

The sign of the change of the resistance value of the strain gauges of the outer member is opposite to the change of the resistance value of the strain gauges of the inner member, but the absolute value is much smaller.

Thus, the stress applied to the adhesive of the bonded portion of the metal vessel is measured from the increase or decrease of the peripheral length of the inner end outer members.

In each of Tables 1 through 3, the tensile stress is a mean value of the resistance values of the eight strain gauges bonded to the inner member, that is, the strain ratio [elongation (+) or shrinkage (−)].

(b) Peel Strength:

The bonded portion is cut out from a metal vessel formed by bonding, and the T-peel strength is measured at room temperature at a pulling speed of 100 mm/min substantially along the entire periphery by using a Tensilon tester. Since the test piece is arcuate, the T-peel tensile test cannot be performed precisely. However, if the pulling speed is relatively reduced, precise measured values can be obtained with a good reproducibility. The measurement is made on 3 sample vessels in each Example, and the arithmetic mean value is determined. The measured value is expressed as $X \pm Y$ (Kg/5 mm width) in which X stands for the mean value obtained by calculating the area of the peel strength curve and Y stands for the deviation of the maximum or minimum value from the mean value. The strength is calculated as per 5 mm of the width.

(c) Shear Strength:

With respect to each of the metal vessels after the bonding operation and the vessels which have been allowed to stand at 70° C. for 10 hours in the water-filled state and dried in vacuo, a specimen including a bonded portion having a length of 7 cm in the direction of the height of the vessel and a length of 2 cm in the circumferential direction is sampled, and the specimen is subjected to a shear fracture test at a pulling speed of 100 mm/min at room temperature by using a Tensilon tester. The shear strength is determined while the bonded area of the lap-bonded portion is taken into consideration. With respect to each sample, three vessels are tested and the arithmetical mean value is calculated. Incidentally, in samples having a shear strength of 55 to 58 Kg, shown in Tables given hereinafter, fracture is caused in the plates, and the practical strength is much higher.

Figure 5:
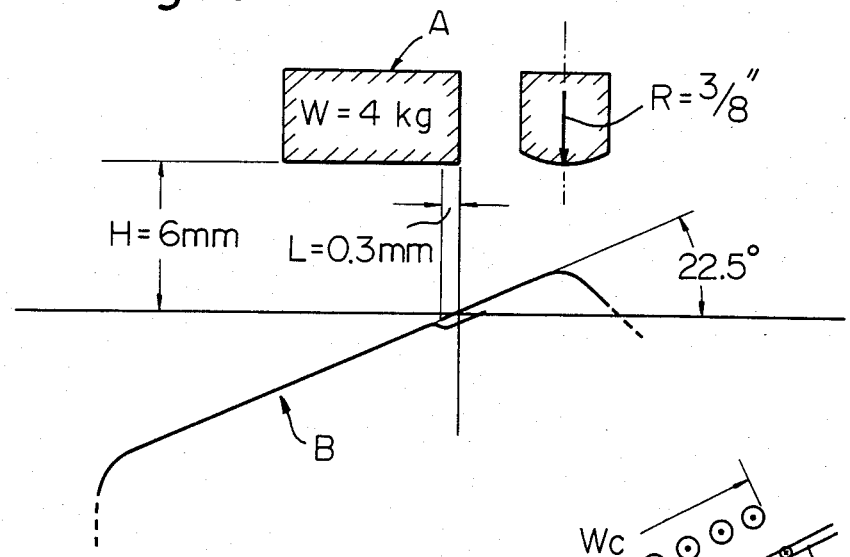
FIG. 5 is a view diagrammatically illustrating the denting test.

[B] Denting Test:

The metal vessel sample is filled with a predetermined content, and as shown in FIG. 5, a 4-Kg weight A is let to vertically fall on the metallic bottle B inclined at an angle of 22.5° with respect to the horizontal direction from a certain height (6 mm) at a position 0.3 mm apart from the outer edge of the bonded portion.

The bottle in which the upper member is separated from the lower member or a clearance is formed in the bonded portion at this test is judged as the barrel breakage bottle. This bottle is then allowed to stand at 25° C. for 48 hours, and the pressure is measured. The bottle in which the inner pressure is lower by more than 5% than the inner pressure just after filling or bleeding of the content is observed in the vicinity of the bonded portion is judged as the leakage bottle. In the Tables, the ratio of the sum of the numbers of the barrel breakage bottles and the leakage bottles to the total number of the tested bottles is shown as "leakage ratio (%)", and the parenthesized value indicates the barrel breakage ratio (%) of the number of the barrel breakage bottles to the total number of the tested bottles.

Incidentally, the test is carried out at 0° C. or 25° C., and with respect to each sample, 50 bottles were tested after it is confirmed that the test temperature is maintained.

[C] Leakage Ratio and Barrel Breakage Ratio after Standing at 50° C. for 3 Months:

The bottle in which the upper member is separated from the lower member or the upper or lower member is deformed to form a clearance in the bonded portion is judged as the barrel breakage bottle, and the bottle in which the inner pressure at 25° C. is lower by more than 5% than the inner pressure at the same temperature just after filling or bleeding of the content is observed in the vicinity of the bonded portion is judged as the leakage bottle. In the Tables, the ratio of the sum of the numbers of the barrel breakage bottles and the leakage bottle to the total number (50) of the tested bottles is shown as "leakage ratio (%)", and the parenthesized value indicates the barrel breakage ratio (%), that is, the ratio of the number of the barrel breakage bottles to the total number of the tested bottles.

EXAMPLES 1 through 7 and Comparative Examples 1 through 4

A modified vinyl paint is coated on the inner and outer surfaces of an aluminum plate (3004 plate, H19) having a thickness of 0.23 mm so that the amounts coated are 150 mg/dm$^2$ and 60 mg/dm$^2$, respectively, and the coated paint is baked. The coated aluminum plate is punched into a disc having a diameter of 94 mm, and the disc is then subjected to a customary pressing operation to obtain an upper member in which the inner diameter of the edge portion to be bonded is 64.20 mm and a pouring mouth having a diameter of 25 mm is formed at the central portion.

An aluminum plate having a thickness of 0.30 mm (plate 3004, H19) is punched into a disc having a diameter of about 142 mm, and the disc is formed into a cup having an inner diameter of about 85 mm between a drawing punch and a drawing die. The formed cup is subjected to redrawing and is then ironed by an ironing punch and die having a diameter of about 66.1 mm. A modified vinyl paint is coated on the outer surface of the formed cup by a mandrel coater so that the amount coated is 60 mg/dm$^2$, and the coated paint was then baked. Then, the inner surface of the cup is spray-coated with the same paint so that the amount coated was 150 mg/dm$^2$, and the coated paint is baked. Then, the cup is subjected to the necking operation to form a lower member in which the outer diameter of the circumferential edge is 64.14 mm.

An adhesive is coated on the entire circumference of the edge of the lower member along a width of about 4 mm on the outer face side and a width of about 1.5 mm on the inner face side in the following manner. A film having a thickness of 60 μm and a width of about 6 mm, which is composed of a copolyester A (solidification temperature = 145° C., volume change ratio = 3.0%, softening point = 175° C.) comprising as the dibasic acid component terephthalic acid and isophthalic acid at a molar ratio of 7/3 and as the glycol component tetramethylene glycol, is applied to the entire circumference of the edge of the outer face of the lower member heated in advance by high frequency induction heating so that the adhesive film protrudes along a width of about 2 mm. Then, the protruding portion of the adhesive tape is folded inward under high frequency induction heating and is bonded to the inner face side to form a lower member having the end edge covered with the adhesive.

The above-mentioned upper member is fitted to the adhesive-applied lower member, and the fitted assembly is passed through heating and cooling zones arranged in one station, whereby the adhesive on the fitted portion is melted, cooled and solidified to obtain a metal vessel having a capacity of about 500 ml, which consists of the bonded upper and lower members. In the heating zone, the fitted assembly is heated for 0.5 second while the fitted assembly is rotated at 480 rpm, and in the cooling zone, water is jetted to the fitted portion for 0.3 second or compressed air is jetted to the fitted portion for 1 second by using a compressed air jet nozzle just after completion of heating.

Figure 6:
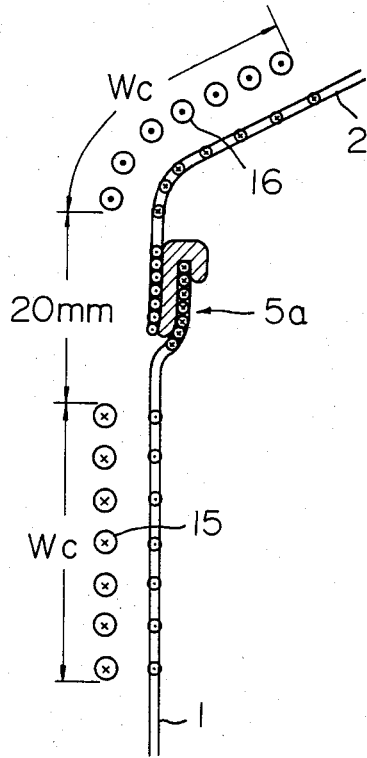
FIG. 6 is a view illustrating the arrangement of the heating coil in the Examples.

As shown in FIG. 6, the shape of the heating coil used at the heating step is such that the diameter of the coil conductors 15 and 16 is 3 mm, the turn number of the flat spiral heating coil is 7, the width Wc of the wound portion of the coil is 25 mm and the width of the empty portion is 20 mm.

The nozzle for cooling the outer member is arranged so that it surrounds the fitted portion of the vessel on the side opposite to the side confronting the heating coil, and the nozzle for cooling the inner member is inserted from the opening of the outer member and set to cool the position corresponding to the outer nozzle.

The heating and cooling steps to be adopted in the foregoing Examples will now be described.

EXAMPLE 1

The heating coil is set in such a manner that the center of the heating coil is lowered by 2 mm ($\Delta l = -2$ mm) from the center of the fitting portion, so that elevation of the temperature of the outer member is equal to elevation of the temperature of the inner member. At the cooling step, air is blown to the outer and inner members.

Figure 7:
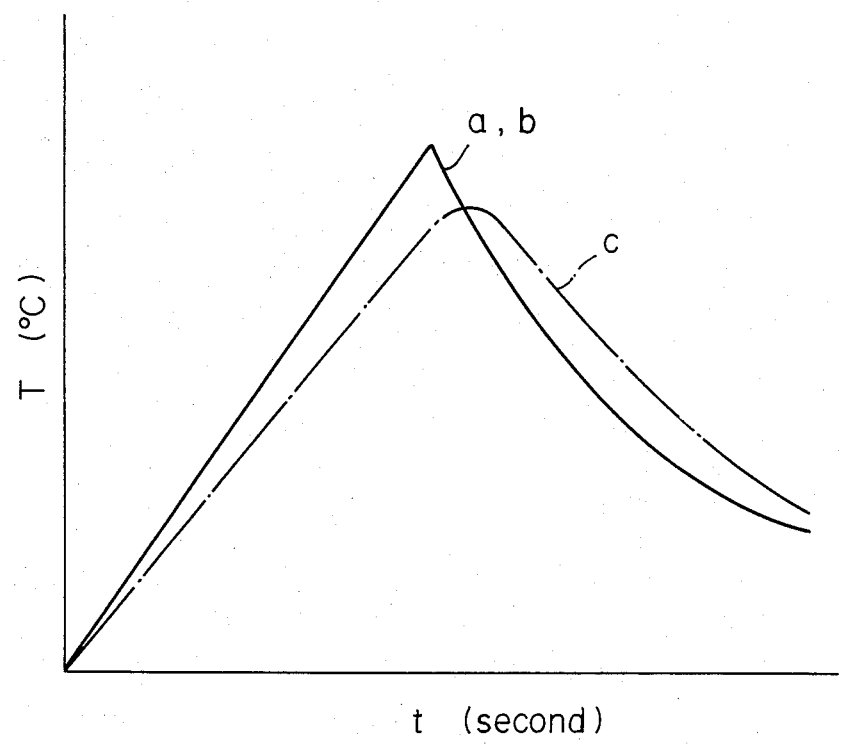
FIGS. 7, 8, 9, 10 and 11 are temperature-time curves obtained at the heating and cooling steps in Example 1, Comparative Example 1, Examples 5 through 7, Comparative Example 2 and Comparative Example 3, respectively.

The temperature of the fitted portion is as shown in FIG. 7. In FIG. 7, curve a indicates the temperature of the fitted portion of the outer member, curve b indicates the temperature of the fitted portion of the inner member, and curve c indicates the temperature of the adhesive.

At the time of completion of heating, the temperature of each of the fitted portions of the outer and inner members is 230° C. and the temperature of the adhesive is 195° C.

The time required for the temperature of the adhesive to fall to the solidification point of 145° C. is 0.5 second from the point of completion of heating.

At the point of time when the adhesive is solidified, the temperatures of the outer and inner members are equally 115° C. Accordingly, no pressing force exceeding the necessary pressing force is imposed on the adhesive and the adhesive is not protruded from the fitted portion, and even after the temperature of the fitted portion is lowered to normal temperature, no tensile stress is applied to the adhesive.

EXAMPLE 2

The heating coil is set in such a manner that the center of the heating coil is raised by 1 mm ($\Delta l = +1$ mm) from the center of the fitted portion, so that the temperature of the fitted portion of the outer member is higher than the temperature of the fitted portion of the inner member. Cooling step is the same as in Example 1.

At the time t1 of completion of heating, the temperature of the outer member is 245° C. and the temperature of the inner member is 215° C., and the temperature of the adhesive is 195° C.

The time required for the temperature of the adhesive to fall to the solidification point of 145° C. is 0.5 second from the point of time of completion of heating. At this point t2, the temperature of the inner member is 110° C. and the temperature of the outer member is 120° C. Since the temperature of the outer member is slightly higher, the clamping force to the adhesive is weakened to some extent, but a slight temperature difference such as mentioned above does not cause any practical trouble.

EXAMPLE 3

The heating coil is set in the same manner as described in Example 2. The air flow rate of the nozzle for cooling the fitted portion of the outer member is made higher than that of the nozzle for cooling the fitted portion of the inner member so that the temperature of the outer member is equal to the temperature of the inner member at the time of solidification of the adhesive.

At the time t1 of completion of heating, the temperature of the outer member is 245° C., the temperature of the inner member is 215° C. and the temperature of the adhesive is 195° C. The time required for the temperature of the adhesive to fall to the solidification point of 145° C. is 0.45 second from the point of time of completion of heating. At this point t2, the temperature of the inner and outer members are equally 115° C.

In this Example, since the temperature of the outer member is higher than that of the inner member at the time of completion of heating, the clamping force is hardly influenced, but since the temperatures of the outer and inner members are substantially equal to each other at the time of solidification of the adhesive, a sufficient clamping force is imposed at this time and good bonding can be attained.

EXAMPLE 4

The heating coil is set in such a manner that the center of the heating coil is lowered by 3 mm ($\Delta l = -3$ mm) from the center of the fitted portion, so that the temperature of the fitted portion of the outer member is lower than the temperature of the fitted portion of the inner member. Cooling step is the same as in Example 1.

At the time t1 of completion of heating, the temperature of the outer member is 220° C. and the temperature of the inner member is 240° C., and the temperature of the adhesive is 195° C.

The time required for solidification of the adhesive is 0.5 second from the time of completion of heating. At this point, the temperature of the outer member 115° C. and the temperature of the inner member is 120° C. Since the temperature of the outer member is slightly lower than the temperature of the inner member, a clamping force acts on the adhesive and there is a risk of protrusion of the adhesive in the molten state. However, no practical trouble is caused.

COMPARATIVE EXAMPLE 1

Figure 8:
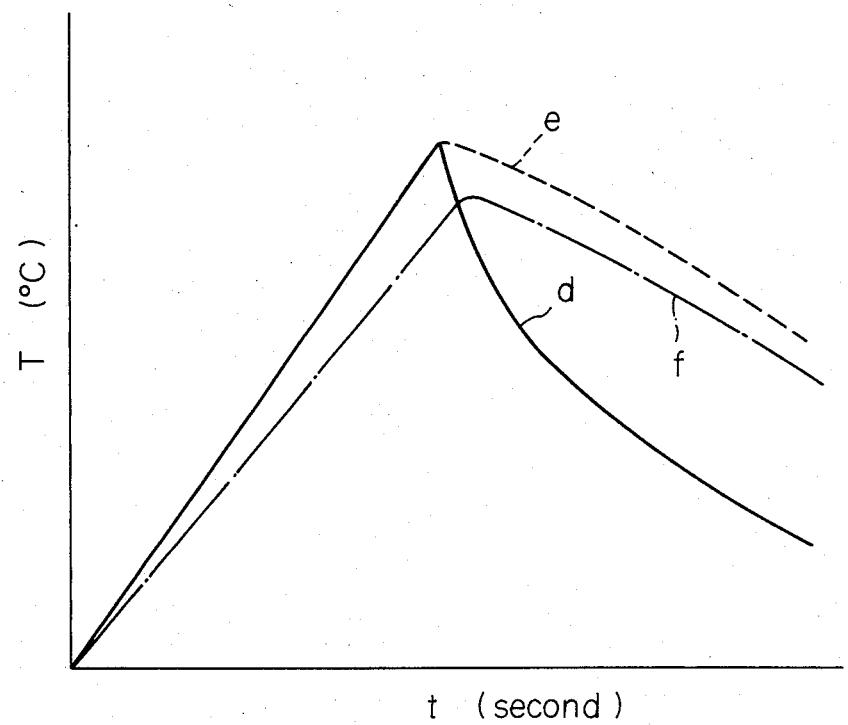

The heating step is the same as in Example 1, and at the cooling step, blowing of compressed air is carried out only on the outer side of the vessel. The temperatures of the respective members are shown in FIG. 8. The curve d shows the temperature of the fitted portion of the outer member, the curve e shows the temperature of the fitted portion of the inner member, and the curve f shows the temperature of the adhesive. The mode of lowering of the temperature in the outer member is substantially the same as in Example 1, but the time required for the temperature of the adhesive to fall down to the solidification point (145° C.) is 1.0 second from the time of completion of heating. At this point, the temperature of the adhesive is equal to the temperature of the inner member and the difference of the temperature between the inner and outer members is 75° C.

As is apparent from the cooling curves of the fitted portions, in the state where the adhesive is melted, the temperature of the fitted portion of the inner member is higher than that of the fitted portion of the outer member, and therefore, a pressing force acts on the adhesive and the adhesive is protruded. Accordingly, a considerable amount of the adhesive is protruded from the fitted portion and a considerable tensile stress acts on the adhesive when the temperature is lowered to normal temperature. This tendency is especially conspicuous when the viscosity of the adhesive in the molten state is low.

EXAMPLES 5, 6 and 7

Figure 9:
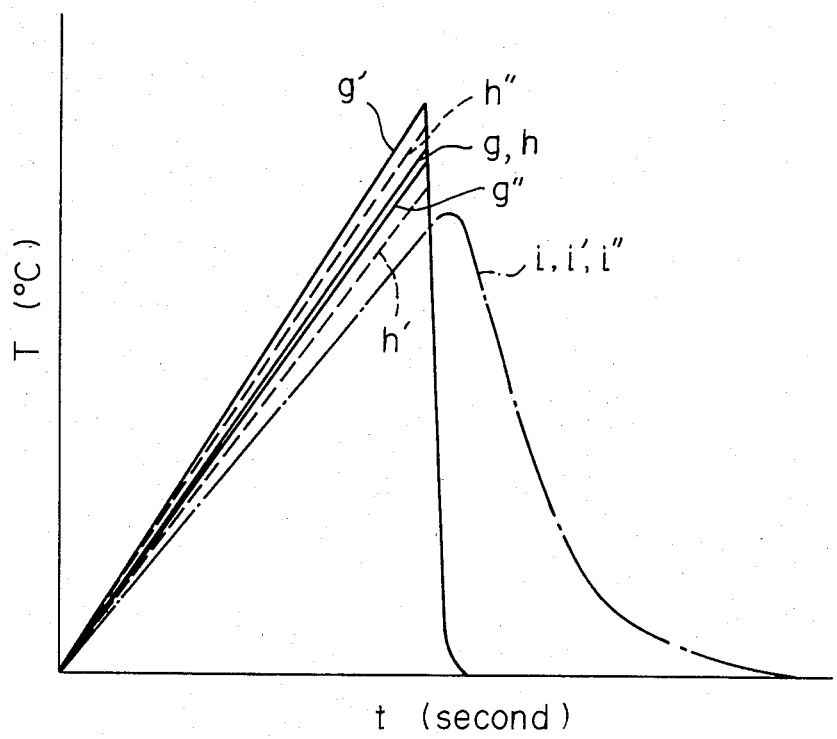

The heating step is the same as in Example 1 (Example 5), or heating is carried out so that the temperatures of the outer and inner members in the fitted portions are 245° C. and 215° C., respectively (Example 6) or 225° C. and 235° C., respectively (Example 7). At the cooling step, water is sprayed instead of compressed air. More specifically, simultaneously with completion of heating, an electromagnetic valve is opened and water in the compressed state is jetted from the nozzle to spray mist of water to the fitted portions of the inner and outer members. The temperature curves of the fitted portions are shown in FIG. 9. Curves g, g' and g" show the temperatures of the outer members, curves h, h' and h" show the temperatures of the inner members, and curves i, i' and i" show the temperatures of the adhesive. Curves g, h and i are those obtained in Example 5, curves g', h' and i' are those obtained in Example 6, and curves g", h" and i" are those obtained in Example 7.

The temperatures of the fitted portions of the outer and inner members heated at 230° C. are abruptly lowered, and the temperature of the adhesive is lowered relatively slowly. When 0.1 second has passed from the point of completion of heating, the temperature of the adhesive falls to the solidification point of 145° C., and at this point, the temperatures of the outer and inner members are equal to the water temperature.

Accordingly, a compressive stress is generated in the adhesive at this point, but since the volume change ratio of the adhesive is as low as 3.0%, the adhesion strength is hardly influenced.

In this case, although cooling of the adhesive is delayed as compared with cooling of the fitted portions of the outer and inner members, the adhesive is cooled considerably rapidly, and when the adhesive is crystalline, the bonding force is especially strong.

COMPARATIVE EXAMPLE 2

Figure 10:
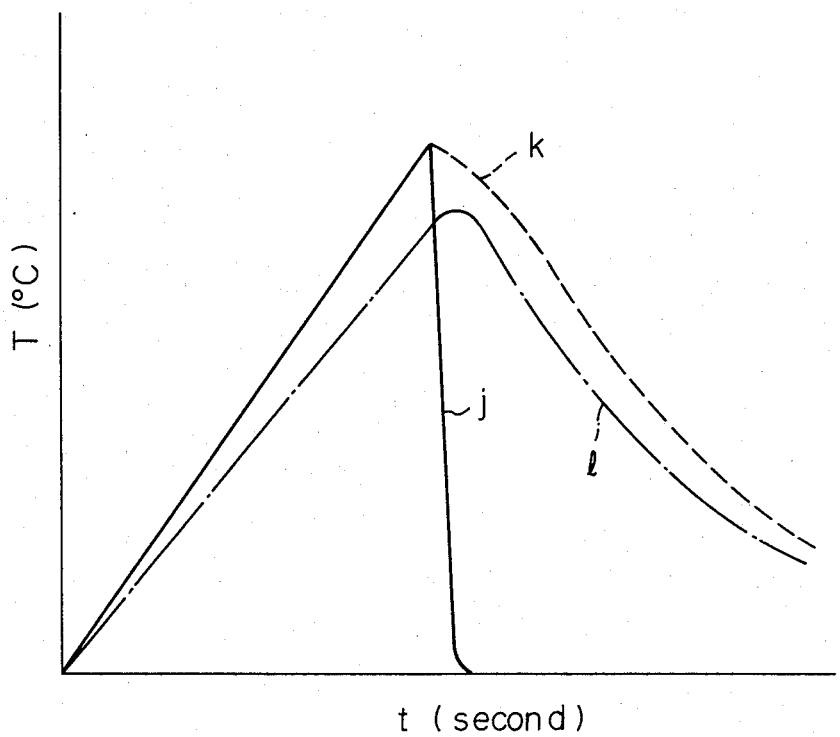

The heating step is the same as in Example 1, and at the cooling step, water is sprayed only on the outer side. The temperatures of the respective members are shown in Table 10. The curve j shows the temperature of the fitted portion of the outer member, the curve k shows the temperature of the fitted portion of the inner member, and the curve l shows the temperature of the adhesive. As is seen from FIG. 10, the temperature of the fitted portion of the outer member is substantially the same as in Example 5, but lowering of the temperatures of the adhesive and inner member is considerably delayed and the time required for the temperature of the adhesive to fall down to the solidification point of 145° C. is 0.3 second from the point of completion of heating. At this point, the temperature of the lower member is higher than the temperature of the adhesive and is 160° C., and the temperature of the outer member is lowered to the vicinity of the water temperature (20° C.). In this case, the time required for solidification of the adhesive is very short, but since the difference of the temperature between the fitted portions of the outer and inner members is considerably large, a considerable amount of the adhesive is protruded from the fitted portion, and therefore, when the temperature of the fitted portion is lowered to normal temperature, a considerable tensile stress acts on the adhesive.

COMPARATIVE EXAMPLE 3

Figure 11:
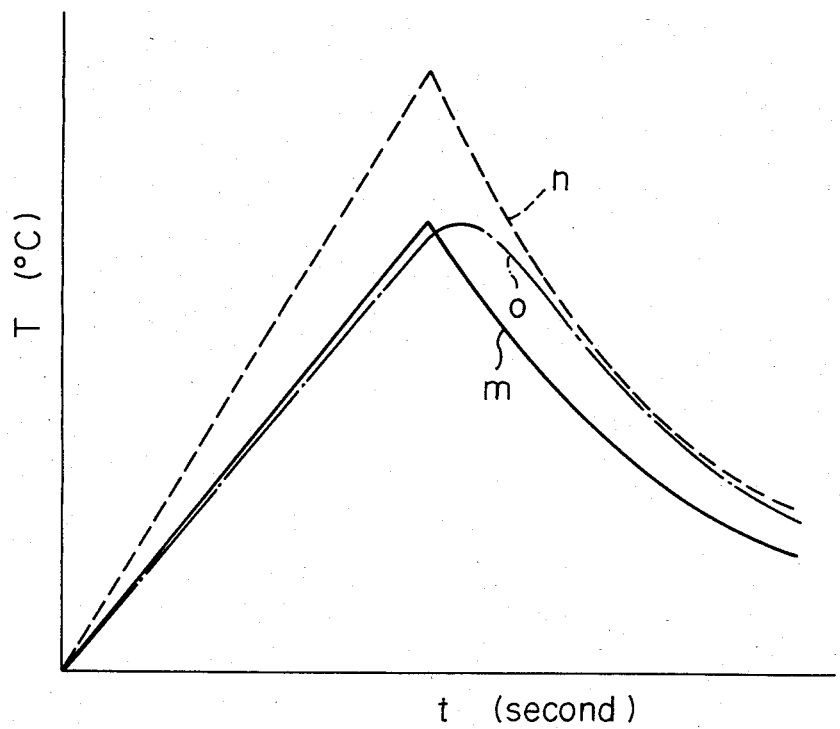

At the heating step, the position of the heating coil is relatively lowered by 7 mm ($\Delta l = -7$ mm) from the fitted portion and the fitted portion is heated for 0.5 second. At the time of completion of heating, the temperature of the fitted portion of the outer member is 200° C., the temperature of the fitted portion of the inner member is 260° C. and the temperature of the adhesive is 195° C. The cooling step is the same as in Example 1. The temperatures of the respective portions are shown in FIG. 11. The curve m shows the temperature of the fitted portion of the outer member, the curve n shows the temperature of the fitted portion of the inner member, and the curve o shows the temperature of the adhesive. For solidification (145° C.) of the adhesive, 0.5 second is necessary from the point of completion of heating. At this point, the temperature of the outer member is 115° C. and the temperature of the inner member is 150° C.

At the time when the adhesive is solidified, the temperature difference between the inner and outer members is 35° C. In this case, although the amount of the adhesive protruded during the period of from the point of completion of heating to the point of solidification of the adhesive is small, since the temperature of the fitted portion of the inner member is higher by 60° C. than the temperature of the fitted portion of the outer member at the time of completion, in case of aluminum, the inner diameter of the outer member is 64.50 mm and the outer diameter of the inner member is 64.52 mm, and a considerable pressing force is imposed on the adhesive in the molten state. Accordingly, the adhesive is considerably protruded. Therefore, when the temperature of the fitted portion is lowered to normal temperature, a considerable tensile stress is imposed on the adhesive.

COMPARATIVE EXAMPLE 4

If compressed air is jetted only on the outer side at the cooling step, since the outer member is rapidly cooled, a pressing force is imposed while the fitted portion is cooled, and a considerable amount of the adhesive is protruded. Accordingly, when the temperature of the fitted portion is lowered to normal temperature, a larger tensile stress is imposed on the adhesive.

The tensile stress and peel strength of the bonded portion of each metal vessel are measured, and cola is filled in the metal vessel, the pouring mouth is plugged and the metal vessel is sterilized at 42° C. by a can warmer. The metal vessel is subjected to the storage test at 50° C. and to the denting test at 0° C. and 25° C. to evaluate the practical strength of the metal vessel. The obtained results are shown in Table 1.

EXAMPLES 8 THROUGH 11 AND COMPARATIVE EXAMPLES 5 AND 6

The inner and outer faces of a bright tin-deposited steel plate (T-1 plate, deposited amount=#50/#50) are coated with an epoxy-phenolic paint so that the amounts coated are 150 mg/dm$^2$ and 60 mg/dm$^2$, respectively, and the coated paint is baked. The coated plate is punched into a disc having a diameter of 94 mm and the disc is subjected to an ordinary pressing operation to form an upper member in which the inner diameter of the end edge of the portion to be bonded is 64.60 mm and a pouring mouth having a diameter of 25 mm is formed in the central portion.

A tin-deposited steel plate is punched into a disc having a diameter of about 142 mm and the disc is formed into a cup having an inner diameter of about 85 mm between a drawing punch and a drawing die. Then, the cup is subjected to a re-drawing operation and is then ironed by an ironing punch and die having a diameter of about 66.1 mm. The outer face of the ironed cup is coated with an epoxy-phenolic paint by a mandrel coater so that the amount coated is 60 mg/dm$^2$, and the coated paint is baked. Then, the inner face of the cup is spray-coated with an epoxy-phenolic paint so that the amount coated is 150 mg/dm$^2$, and the coated paint is baked. Then, the coated cup is subjected to a necking operation to form a lower member in which the outer diameter of the circumferential edge is 64.45 mm (Example 8), 64.48 mm (Example 9), 64.53 mm (Example 10), 64.60 mm (Example 11), 64.68 mm (Comparative Example 5) or 64.36 mm (Comparative Example 6).

A polyamide A obtained by polycondensation of dimer acid, polyalkylene polyamine and hexamethylene diamine is coated on the entire periphery of the end edge on the outer face side of the lower member by a hot melt applicator provided with a gear pump along a width of about 4 mm in a thickness of 80 μm.

The upper member is fitted with the adhesive-applied upper member, and the fitted assembly is heated and cooled under the same conditions as in Example 1 to obtain a metal vessel having a capacity of about 500 ml, which consists of the upper and lower members bonded to each other through the adhesive. In Example 10, the upper member is heated at about 150° C., and in Comparative Example 5, the upper member is heated at about 230° C., and fitting is carried out after the end edge is thus expanded. In Comparative Example 6, at the fitting step, air is blown from the pouring mouth so that the inner pressure is maintained at about 5 Kg/cm$^2$, and after both the members have thus been expanded, the adhesive is melted, cooled and solidified.

The tensile stress of the bonded portion of each metal vessel is measured. The metal vessel is filled with a synthetic carbonated drink and the pouring mouth is plugged, and the metal vessel is sterilized at 42° C. by a can warmer. The metal vessel is subjected to the storage test at 50° C. and to the denting test at 0° C. and 25° C. to evaluate the strength of the vessel. The obtained results are shown in Table 2. Also the physical properties of the adhesive and the dimensions of the end edges of both the members are shown in Table 2.

EXAMPLES 12 THROUGH 16 AND COMPARATIVE EXAMPLE 7

A modified vinyl paint is coated on the inner and outer faces of an aluminum plate (3004 plate, H19) having a thickness of 0.23 mm so that the amounts coated are 180 mg/dm$^2$ and 80 mg/dm$^2$, respectively, and the coated paint is baked. The coated plate is punched into a disc having a diameter of 250 mm and processed according to an ordinary pressing operation to form an upper member in which the inner diameter of the end edge of the portion to be bonded is 110.60 mm and a pouring mouth having a diameter of 30 mm is formed in the central portion.

A disc having a diameter of 250 mm is punched from the same coated plate, and the disc is subjected to a pressing operation to form a lower member in which the outer diameter of the edge of the portion to be bonded is 110.50 mm.

An adhesive is coated on the entire circumference of the end edge of the lower member along a width of about 6 mm on the outer face side and a width of about 2 mm on the inner face side in the following manner. More specifically, in Example 12, the lower member is masked so that the end edge is exposed along a width of 6 mm on the outer face side and along a width of 2 mm on the inner face side, and nylon 12 is electrostatically coated on the lower member, and the coated portion is heated by an infrared ray heater to melt the powder and form a coating film having a thickness of about 85 μm. In Example 13, a film having a thickness of 80 μm and a width of 8 mm, which consists of a polyester B comprising as the dibasic acid component terephthalic acid and as the glycol component tetramethylene glycol and triethylene glycol at a molar ratio of 10/1, is applied to the entire circumference at the end edge of the outer face of the lower member heated in advance by high frequency induction heating so that the film protrudes from the end edge along about 2.5 mm. The protruding portion of the film is folded inward and applied to the inner face side while the end edge heated by high frequency induction heating, whereby a lower member having the end edge covered with the adhesive is formed. In Example 14, a copolyester blend consisting of a copolyester PET/I comprising as the dibasic acid component terephthalic acid and isophthalic acid at a molar ratio of 8.5/1.5 and ethylene glycol, a copolyester PBT/I comprising as the dibasic acid component terephthalic acid and isophthalic acid at a molar ratio of 6.5/3.5 and tetramethylene glycol and an ionomer (PET/I:PBT/I:ionomer blend ratio=1:7:2), which is in the form of a film having a thickness of 80 μm and a width of 8 mm, is coated in the predetermined shape in the same manner as in Example, 13. In Example 15, a powder of maleic anhydride-modified polypropylene having a particle size of about 30 μm is coated in the predetermined shape on the end edge of the lower member in the same manner as in Example 12. In Example 16, a part of the end edge of the lower member is immersed in the state inclined at about 70° from the vertical direction into a bath filled with a 30% solution of a vinyl chloride-vinyl acetate copolymer comprising vinyl chloride and vinyl acetate at a ratio of 9:1 while the lower member is gently rotated. The solvent is evaporated and the resin is melted in a hot air oven to form an adhesive film of the above-mentioned shape having a thickness of about 80 μm on the end edge portion of the lower member. In Comparative Example 7, a powder having a particle size of about 25 μm, which consists of a blend comprising an ethylene-vinyl acetate copolymer (EVA; ethylene:vinyl acetate copolymerization ratio=8.5:1.5) and high density polyethylene (HDPE) at an EVA:HDPE blend ratio of 1:9, is coated in the predetermined shape on the end edge of the lower member in the same manner as in Example 12.

The upper member is fitted with the adhesive-applied upper member, and the fitted assembly is heated and cooled under the same conditions as in Example 5 to obtain a metal vessel having a capacity of about 2 l, which consists of the upper and lower members bonded to each other.

The tensile stress of the bonded portion of each metal is measured, and the shear strength is measured just after bonding and after 10 hours' standing at 70° C. in the water-filled state. Furthermore, each metal vessel is filled with beer and the pouring mouth is plugged. The metal vessel is sterilized at 65° C. for 30 minutes and subjected to the denting test at 0° C. and 25° C., and the metal vessel is stored at 50° C. for 3 months and the leakage or breakage is checked. The obtained results and the physical properties of each adhesive are shown in Table 3.

TABLE 1

|  | Results of Strength Test of Bonded Portion | | Denting Test Results [Leakage Ratio, % (Barrel Breakage Ratio, %)] | | Leakage Ratio, % (Barrel Breakage Ratio, %) after 3 Months' Standing at 50° C. |
|---|---|---|---|---|---|
|  | tensile stress (Strain $\times 10^6$) | peel strength (Kg/5 mm width) | 0° C. | 25° C. |  |
| Example 1 | 187 | 4.3 ± 0.2 | 0 | 0 | 0 |
| Example 2 | 406 | 4.4 ± 0.5 | 0 | 0 | 0 |
| Example 3 | 250 | 4.6 ± 0.3 | 0 | 0 | 0 |
| Example 4 | 125 | 4.2 ± 0.7 | 2 | 0 | 0 |
| Example 5 | 328 | 5.0 ± 0.5 | 0 | 0 | 0 |
| Example 6 | 437 | 4.7 ± 0.7 | 2 | 0 | 0 |
| Example 7 | 156 | 4.2 ± 1.2 | 2 (2) | 0 | 2 |
| Comparative Example 1 | −62 | 2.6 ± 1.4 | 60 (8) | 26 (4) | 56 (2) |
| Comparative Example 2 | −93 | 3.1 ± 1.7 | 78 (28) | 40 (14) | 34 (2) |
| Comparative Example 3 | −125 | 2.5 ± 1.8 | 86 (24) | 34 (10) | 76 (4) |
| Comparative Example 4 | −187 | 2.3 ± 2.0 | 94 (36) | 48 (14) | 96 (10) |

TABLE 2

|  |  | Dimensioned (mm) of End Edge | | Tensile Stress (strain $\times 10^6$) of Bonded Portion | Results of Denting Test [Leakage Ratio, % (Barrel Breakage Ratio, %)] | | Leakage Ratio, % (Barrel Breakage Ratio, %) after 3 Months' Standing at 50° C. |
|---|---|---|---|---|---|---|---|
|  | Adhesive | $D_O$ (inner diameter of upper member) | $D_I$ (outer diameter of lower member) |  | 0° C. | 25° C. |  |
| Example 8 | polyamide A, hot melt type, solidification temperature Ts of 158° C., volume change ratio δ of 2.8%, softening point of 180° C. | 64.60 | 64.45 | 2 | 0 | 0 | 0 |
| Example 9 | polyamide A, hot melt type, solidification temperature Ts of 158° C., volume change ratio δ of 2.8%, softening point of 180° C. | 64.60 | 64.48 | 143 | 0 | 0 | 0 |
| Example 10 | polyamide A, hot melt type, solidification temperature Ts of 158° C., volume change ratio δ of 2.8% softening point of 180° C. | 64.60 | 64.53 | 230 | 0 | 0 | 0 |
| Example 11 | polyamide A, hot melt type, solidification temperature Ts of 158° C., volume change ratio δ of 2.8%, softening point of 180° C. | 64.60 | 64.60 | 520 | 2 (0) | 0 | 0 (slight deformation of bonding portion) |
| Comparative Example 5 | polyamide A, hot melt type, solidification temperature Ts of 158° C., volume change ratio δ of 2.8% softening | 64.60 | 64.68 | 1500 | 38 (20) | 4 (2) | 4 (2) (deformation of bonded portion often observed) |

TABLE 2-continued

| | Adhesive | Dimensioned (mm) of End Edge | | Tensile Stress (strain × 10⁶) of Bonded Portion | Results of Denting Test [Leakage Ratio, % (Barrel Breakage Ratio, %)] | | Leakage Ratio, % (Barrel Breakage Ratio, %) after 3 Months' Standing at 50° C. |
|---|---|---|---|---|---|---|---|
| | | $D_O$ (inner diameter of upper member) | $D_I$ (outer diameter of lower member) | | 0° C. | 25° C. | |
| Comparative Example 6 | point of 180° C. polyamide A, hot melt type, solidification temperature Ts of 158° C., volume change ratio δ of 2.8%, softening point of 180° C. | 64.60 | 64.36 | −3000 | 88 (70) | 56 (16) | 94 (12) |

TABLE 3

| | Adhesive (Softening Point, °C.) | Solidification Temperature Ts (°C.) | Volume Change Ratio δ (%) | Results of Strength Test of Bonded Portion | | | Results of Denting Test [Leakage Ratio, % (Barrel Breakage Ratio, %)] | | Leakage Ratio, % (Barrel Breakage Ratio, %) after 3 Months' Standing at 50° C. |
|---|---|---|---|---|---|---|---|---|---|
| | | | | Tensile Stress (strain × 10⁶) | Shear Strength (Kg/cm²) | | | | |
| | | | | | just after bonding | after 10 hours' immersion in water at 70° C. | 0° C. | 25° C. | |
| Example 12 | nylon 12 (178) | 150 | 4.2 | 85 | >56 | >57 | 0 | 0 | 0 |
| Example 13 | copolyester B (190) | 142 | 2.7 | 140 | >58 | >55 | 0 | 0 | 0 |
| Example 14 | copolyester blend 185 | 136 | 3.9 | 194 | >57 | >57 | 0 | 0 | 0 |
| Example 15 | maleic anhydride-modified polypropylene (165) | 121 | 7.6 | 25 | >56 | >55 | 0 | 0 | 0 |
| Example 16 | vinyl chloride-vinyl acetate copolymer (100) | 98 | 1.1 | 104 | >58 | >57 | 0 | 0 | 0 |
| Comparative Example 7 | EVA—HDPE blend (130) | 107 | 11.2 | −120 | >55 | 43 | 94 (76) | 36 (30) | 64 (16) |

What is claimed is:

1. A process for preparation of metal vessels, which comprises lap-bonding circumferential open end portions of outer and inner members, each consisting of a formed seamless metal cup, to each other through an adhesive, said process being characterized by fitting both the outer and inner members to each other through an adhesive layer interposed between the open end portions of both the members, heating the fitted portions of both the outer and inner members so as to melt the adhesive layer, and cooling the fitted portions so that the temperatures of the fitted portions of both the outer and inner members are substantially equal to each other just before solidification of the adhesive layer and the adhesive is filled between both the open end portions.

2. A process according to claim 1, wherein the fitted portions are heated so that the temperature of the fitted portion of the inner member is substantially equal to or slightly lower than the temperature of the fitted portion of the outer member.

3. A process according to claim 1, wherein the adhesive layer is interposed in the fitted portion so that the requirements of $D_O \geq D_I$ and $D_I + 2d_A > D_O$ are satisfied:

wherein $D_I$ stands for the outer diameter of the fitted portion of the inner member, $D_O$ stands for the inner diameter of the fitted portion of the outer member, and $d_A$ stands for the applied thickness of the adhesive layer.

4. A process according to claim 1, wherein the adhesive is a thermoplastic adhesive having a volume change ratio δ lower than 10% at a temperature in the range of Ts±10° C. in which Ts stands for the temperature at which the adhesive is substantially solidified and also having a softening point of 80° to 280° C., said volume change ratio δ being expressed by the following formula:

$$\delta = (Va - Vb/Vb) \times 100$$

wherein Va stands for the specific volume (c.c./g) at the temperature of Ts+10° C. and Vb stands for the specific volume (c.c./g) at the temperature of Ts−10° C.

5. The process of claim 1 wherein the step of cooling the fitted portions comprises applying a cooling fluid medium to each of the outer and inner members.

6. The process of claim 5 wherein the temperature of the cooling fluid applied to the inner member is lower than the temperature of the cooling fluid applied to the outer member.

7. The process of claim 1 wherein the temperature $T_1$ of the inner member in the fitted portion and the temperature $T_2$ of the outer member in the fitted portion satisfy the following relationship:

$$T_2 + 10° C. \geq T_1 \geq T_2 - 5° C.$$

* * * * *